United States Patent [19]

Beaudin et al.

[11] Patent Number: 5,367,318
[45] Date of Patent: Nov. 22, 1994

[54] METHOD AND APPARATUS FOR THE SIMULTANEOUS DISPLAY OF ONE OR MORE SELECTED IMAGES

[75] Inventors: Raymond A. Beaudin, Windham, N.H.; Joseph R. Fallon, Boxford; Leslie I. Halberg, North Reading, both of Mass.

[73] Assignee: Hewlett-Packard Company, Palo Alto, Calif.

[21] Appl. No.: 59,904

[22] Filed: May 10, 1993

Related U.S. Application Data

[63] Continuation of Ser. No. 318,028, Mar. 2, 1989, Pat. No. 5,250,933.

[51] Int. Cl.$^5$ .............................................. G09G 1/02
[52] U.S. Cl. .................................. 345/201; 345/185; 364/413.22
[58] Field of Search .............. 340/703, 721, 798, 799, 340/747; 128/660, 661.04; 364/413.22, 413.23, 413.12; 358/111, 112, 22, 23; 382/47; 378/98, 99; 345/185, 186, 201, 202, 115; 348/163

[56] References Cited

U.S. PATENT DOCUMENTS

| | | | |
|---|---|---|---|
| 4,121,283 | 10/1978 | Walker | 340/799 |
| 4,335,427 | 6/1982 | Hunt et al. | 358/111 |
| 4,450,478 | 5/1984 | Ledley | 364/413.23 |
| 4,611,247 | 9/1986 | Ishida et al. | 364/413.13 |
| 4,686,580 | 8/1987 | Kato et al. | 382/47 |
| 4,700,299 | 10/1987 | Kimura et al. | 364/413.22 |
| 4,703,356 | 10/1987 | Herzog et al. | 358/111 |
| 4,764,975 | 8/1988 | Inoue | 382/47 |
| 4,772,881 | 9/1988 | Hannah | 340/701 |
| 4,777,598 | 10/1988 | Kellar et al. | 364/413.22 |
| 4,858,129 | 8/1989 | Mori | 358/111 |
| 4,865,040 | 9/1989 | Ogasawara | 128/661.04 |
| 4,935,815 | 6/1990 | Ichikawa | 358/105 |

FOREIGN PATENT DOCUMENTS

0187262 7/1986 European Pat. Off. .

Primary Examiner—Alvin E. Oberley
Assistant Examiner—Chanh Nguyen

[57] ABSTRACT

A system for displaying selected images on a video display device is provided. One or more sources of image frames are included which sources may be digital or analog and which sources may present pixel data in different selected formats. A frame memory is provided which is adapted to store a plurality of memory frames each of which may store one or more image frames to be displayed. Image frames are selectively stored in the memory frames of the frame memory in the format in which they are received. The images may be stored in full size or may be compressed for windowing display and selected information concerning image frames may be utilized to control the mapping of values stored for the pixels of the image frames. A display frame may be formed of two or more compressed image frames with each image frame being read out from a selected memory frame which memory frame may be independent of or the same as the memory frame for other read out images. Certain images may contain two or more different types of information which may be selectively processed when read out from a frame memory to cause the content of such multiple information images to be displayed as multiple separate images containing the content of the image frame in various permutations and combinations. Color mapping using the same or different criteria may also be provided, with the color mapping being independent for each of the image frames being simultaneously displayed.

25 Claims, 6 Drawing Sheets

METHOD AND APPARATUS FOR THE SIMULTANEOUS DISPLAY OF ONE OR MORE SELECTED IMAGES

This is a continuation of copending application Ser. No. 07/318,028 filed on Mar. 2, 1989, U.S. Pat. No. 5,250,933.

FIELD OF THE INVENTION

This invention relates to video display systems and more particularly to a method and apparatus for providing a high level of flexibility in the image frames which are available for display, either singly or in multiple image combinations, including the capability of separately displaying various types of information from a single image frame, for independently mapping image levels and colors in each displayed image frame, and for simultaneously storing and displaying images from different sources and in different formats in a manner transparent to the user.

BACKGROUND OF THE INVENTION

In many applications, including scientific, industrial, educational, medical and military applications, information received from a single source, from a single source at different times, or from multiple sources are provided on a video display. Various windowing techniques are available for permitting two or more of such images to be simultaneously displayed to either provide the user with additional information or to permit various comparisons to be made.

while existing systems of this type offer many capabilities, such systems normally have limited flexibility and lack various useful options. For example, most such systems are adapted to only receive information from digital sources and in particular digital sources which present the display pixel information in a particular format. These systems do not have the capability of mixing information received from both digital and analog sources, which sources may present the information in different formats, and to both store such information in a common memory and to simultaneously display such information on a single monitor, all in a manner transparent to the user. Such systems also frequently lack a capability for mapping received information in a flexible manner to obtain display levels and most such systems do not have the capability of flexibly color mapping images to be displayed, which images are in either color or black and white, with a capability for color mapping image frames being simultaneously displayed using different mapping guidelines for at least selected ones of the displays. Another limitation with most existing systems is that they do not have the capability of separating various types of information available in a single image frame and for simultaneously processing such different types of information in different ways with the results of such processing being simultaneously displayable either alone or in conjunction with other information.

Further, for maximum flexibility in displaying multiple images, it is desirable to be able to compress or crop images horizontally and/or vertically as they are being stored with little or no additional steps and to be able to easily crop stored images for display.

A need therefore exists for a method and apparatus for controlling the display of one or more image frames on a display device which provides enhanced capability and flexibility over existing systems. In particular, such capability is required in conjunction with medical ultrasonic scanning equipment which is adapted to receive both black and white tissue data and Doppler color flow data from a single ultrasonic scan, and may also receive information concerning prior ultrasonic scans on the same patient, or other information useful in the diagnosis or treatment of a patient, from a video recorder or other analog source in a standard composite video format rather than in a selected digital black and white or color format. In such an application, a need may exist for storing and/or simultaneously displaying the differently formatted inputs, for quantizing information received from scans, for separating tissue and color flow data for display and analysis and for manipulating the color mapping of either the color flow data or the normally black and white tissue data to more clearly show information needed by the physician or other medical personnel utilizing the system.

SUMMARY OF THE INVENTION

In accordance with the above, this invention provides a system for displaying at least one selected image, and preferably two or more selected images, on a video display device of the type which causes an image to appear as an image frame in a display frame formed from a plurality of display pixels. The system may include one or more sources of image frames which sources may be digital or analog and which sources may present pixel data in different selected formats. A frame memory is provided which is adapted to store a plurality of memory frames each of which may store one or more image frames to be displayed. Image frames are selectively stored in the memory frames of the frame memory in the format in which they are received. Selected information concerning each image frame being stored may be utilized to control the mapping of values stored for pixels of the image frame. The images may be stored in full size, or may be compressed for windowing display, either by cropping, by selectively dropping pixels or by other known compression techniques. A display frame may be formed of two or more compressed image frames with each image frame being read out from a selected memory frame which memory frame may be independent of or the same as the memory frame for other read-out images.

The two or more frames simultaneously displayed on the display device may be a digital image and an analog image from separate sources. In an ultrasonic scanner application, the digital image may be an ultrasonic image obtained from a current scan while the analog image is an image, obtained from for example a video recorder, of a prior scan on the same individual.

Where images contain two or more different types of information, such as in an ultrasonic application where the image may contain both tissue and color flow information, processing means may be provided which processes the received image in a selected way to cause the content of the multiple information images to be displayed as multiple separate images containing the content of the image frame in various permutations and combinations. For example, image frames being simultaneously displayed may contain either one or both types of information, with thresholding being provided for one or both types of information for selected ones of the image frames being displayed. Color mapping using the same or different criteria may also be provided, with the color mapping being independent for each of the image frames being simultaneously displayed.

The foregoing and other objects, features and advantages of the invention will be apparent from the following more particular description of a preferred embodiment of the invention as illustrated in the accompanying drawings.

DETAILED DESCRIPTION

Figure 1:
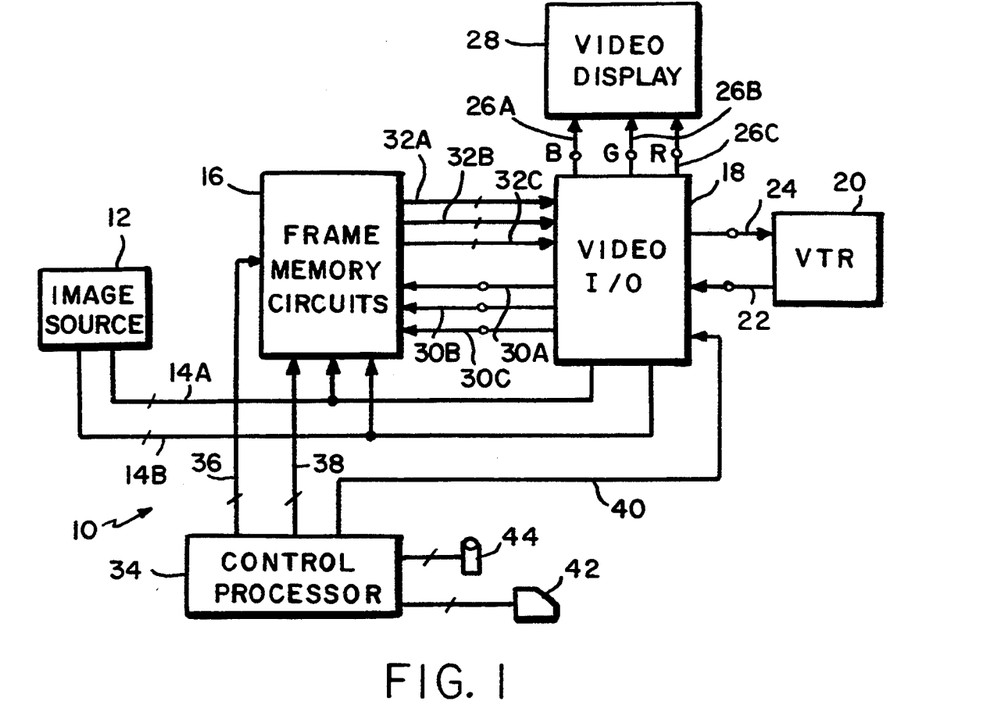
FIG. 1 is a schematic block diagram of a system in which the teachings of this invention may be utilized.

Referring first to FIG. 1, the major components of a video display system in which the teachings of this invention might be employed are shown. In this drawing, and in the remaining circuit diagrams, lines which carry digital signals are illustrated with a diagonal line which line may also contain an indication of the number of wires or lines which form the digital bus or cable. Lines which contain analog signals have a circle in them.

Thus, in FIG. 1, the circuit 10 has one or more digital image sources 12 each of which sources may be connected by a black and white bus 14A (the SBW bus) and a color bus 14B (the SCL bus) to frame memory circuits 16 and video I/O circuit 18. For a preferred embodiment, image sources 12 are various types of information available from an ultrasonic scanning system such as tissue and color flow data or M mode data. The former will be discussed in greater detail later while the latter is the image which results from a sequence of scan lines in a single scan direction. The number of lines in buses 14 will vary with the image sources 12 and with the degree of resolution required from the system. In a typical application, such buses might contain 8 or 9 lines each. The digital format in which pixel information is presented (i.e., the coding) for the black and white and/or the color bus may also vary with application.

In addition to digital images obtained from sources 12, images may also be obtained from an analog source or sources such as video tape recorder (VTR) 20 over analog lines 22, such inputs being applied to video I/O circuit 18. The format for the analog pixel data would typically be a standard composite video format and would normally be a different format than the digital format on lines 14. Video I/O circuit 18 may also apply analog signals over analog lines 24 to VTR 20, may apply blue, green and red video data signals over lines 26 to control video display 28 and may apply analog signals derived from VTR 20 over lines 30 to frame memory circuit 16. As will be discussed in greater detail later, in order to reduce memory utilization requirements, the analog information to circuit 16 is converted into a luminance level (Y) on line 30A, a red-minus-luminance (RMY) signal on line 30B and a blue-minus-luminance (BMY) signal on line 30C and is digitized and stored in this format. Thus, the pixel data obtained from VTR 20 may be stored in a different format from the digital data received in lines 14.

Digital signals from frame memory circuit 16 are applied over lines 32 to video I/O circuit 18. The lines 32A, 32B and 32C carry the red, green and blue component respectively if data originally stored from an analog source such as VTR 20 is being output from frame memory circuits 16. When information originally stored from a system bus 14 is outputted from memory circuits 16, black and white data is outputted on line 32B and color data is outputted on line 32C. As will be discussed in greater detail later, for some types of image frames, both black and white and color data are outputted.

In addition to the digital image source(s) 12, and the analog image source(s) 20, image information may also be stored in frame memory circuits 16 directly from a control processor 34 over digital lines or bus 36. Control processor 34 also generates various control signals over lines 38 to frame memory circuits 16 and over lines 40 to video I/O circuit 18. The signals on lines 38 and 40 may perform a variety of functions which will be described in greater detail later, including indicating the current state or mode of the system for the image currently being read out, setting threshold levels, providing mapping information to various control RAMs and controlling the storing and reading out of information from the frame memory circuits 16. The system user may provide control inputs to processor 34 from a number of standard I/O devices including keyboard 42 and roller ball 44.

Figure 5:
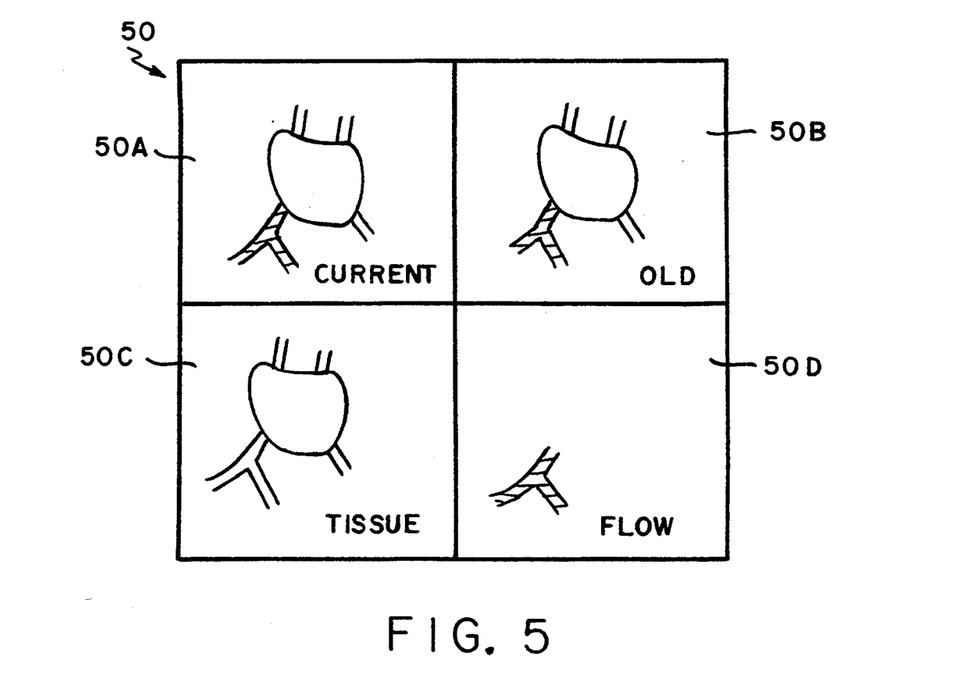
FIG. 5 is a diagram of an exemplary four quad display obtained utilizing the teachings of this invention.

The video display 28 shown in FIG. 1 may, for example, be a standard cathode ray tube monitor which has a matrix of display pixels, for example 512×512, each of which may provide a selected color or grey scale display. The system shown in FIG. 1 is adapted to generate a variety of image displays on video display 28. The display on video display 28 may, for example, be a single video image from an image source 12, an image source 20, or control processor 34 which image fills the entire screen of display 28. Alternatively, as shown in FIG. 5, the screen may be divided into a selected number of areas or windows, four such areas being shown in FIG. 5. Under these circumstances, one image frame of the display, for example upper left image frame 50A, may display an image of the current system information being outputted on buses 14. A second image frame may contain old information on the individual currently being examined which image data is obtained from VTR 20. This image may for example be displayed in upper right image frame 50B of the display. Either the current information or the old information may be applied to video I/O circuit 18 directly from the source or may be initially stored in circuits 16 and applied to the video I/O from these circuits. While in some applications the current and old information may each occupy half of the display screen, in FIG. 5, for illustrative purposes, two additional types of information are shown. Thus, bottom left frame 50C contains an image of only the tissue portion of the composite current image being shown in frame 50A while bottom right frame 50D shows only the color flow portion of the image in frame 50A. As will be discussed in greater detail later, each of the images in areas 50A–50D may be independently processed to, for example, threshold selected information in the image, color map the image in a selected way, or perform some other desired processing function.

The capability for performing the multiple image display function with flexible controls is provided by frame memory circuits 16 and video I/O circuit 18 under control of processor 34.

Figure 2:
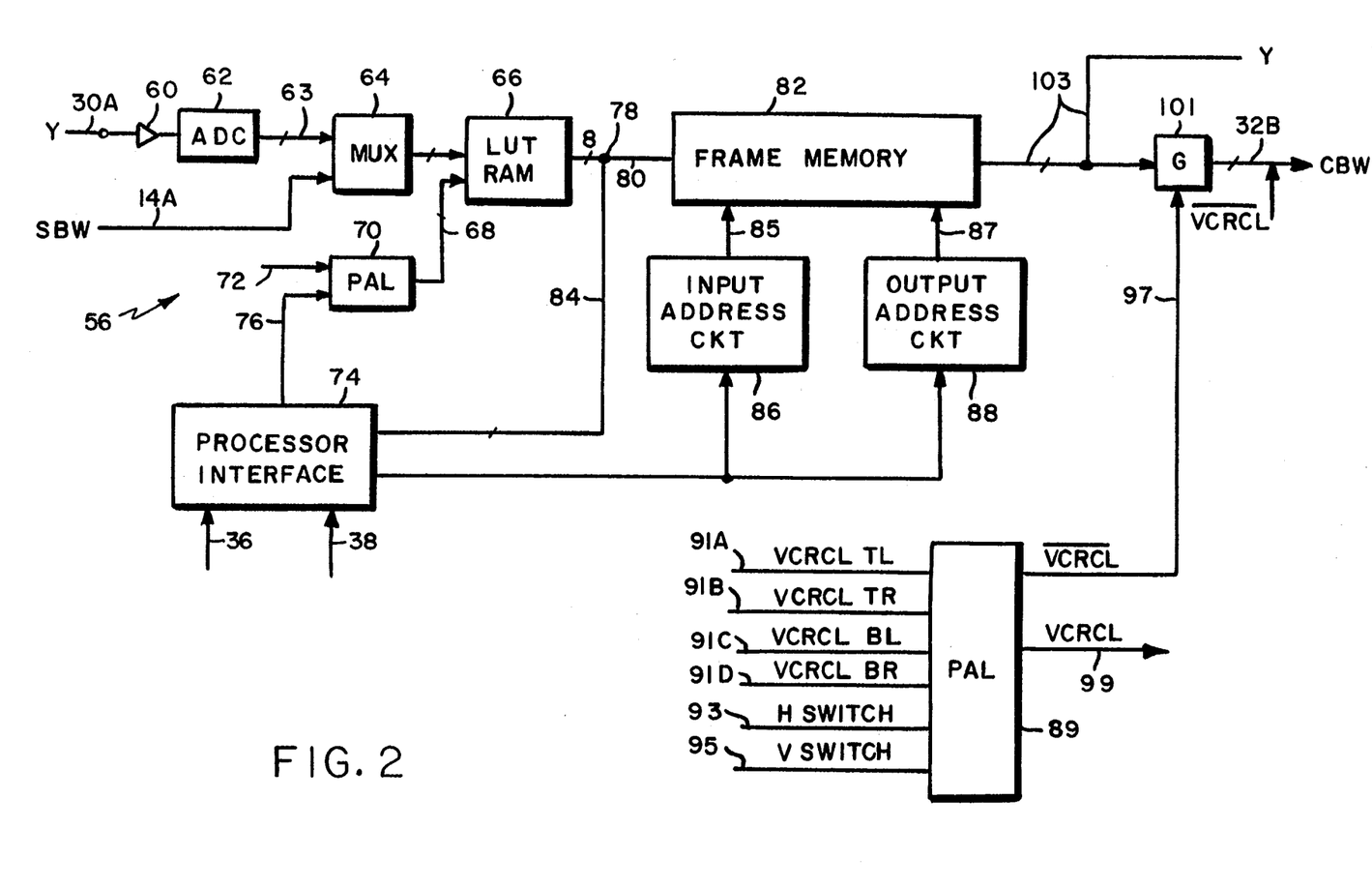
FIG. 2 and FIG. 3 are schematic block diagrams of a black and white control circuit and a color control circuit respectively suitable for use in the frame memory circuits shown in FIG. 1.
Figure 3:
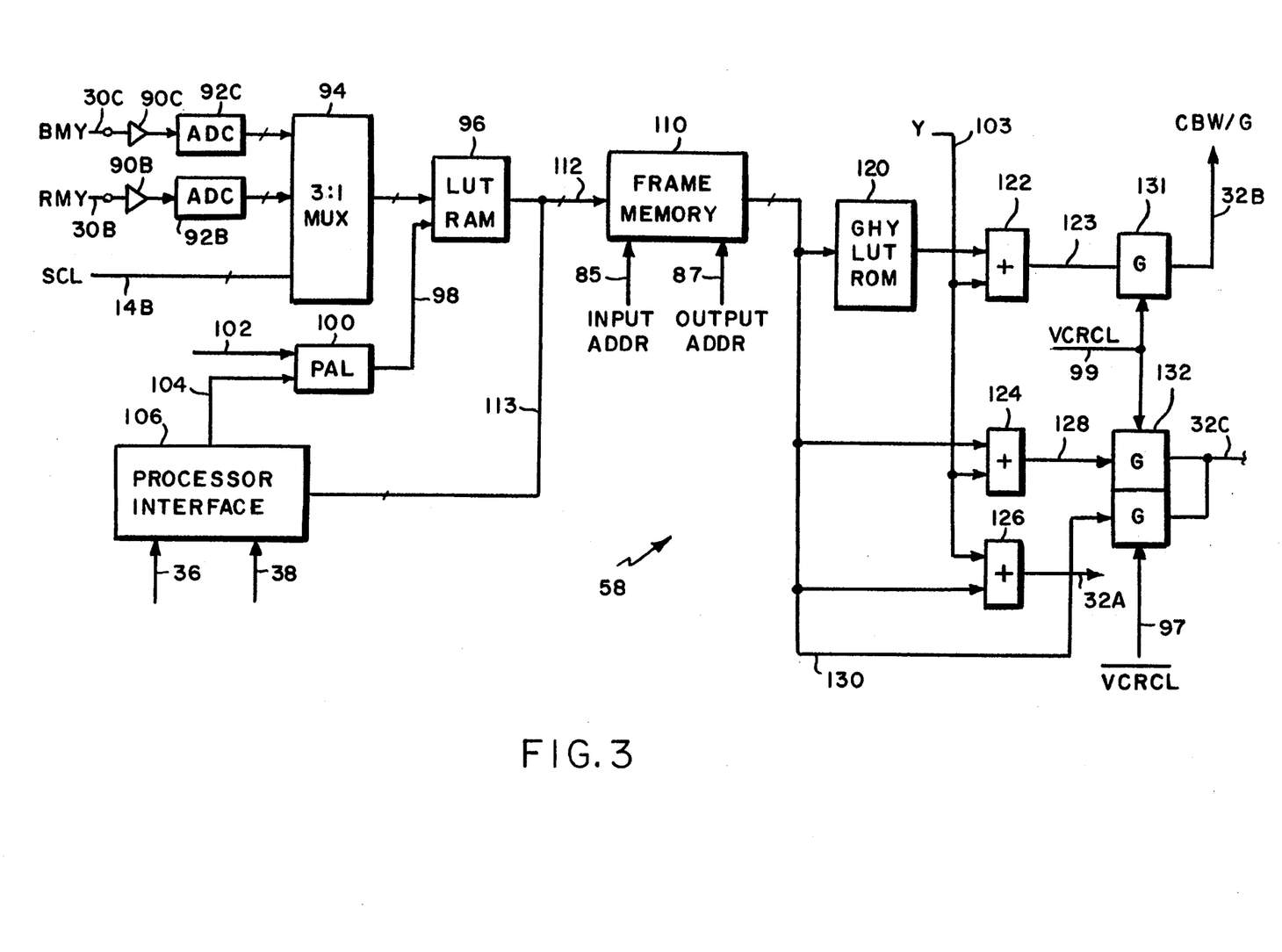

FIGS. 2 and 3 respectively show the black and white circuit 56 and the color circuit 58 which form frame memory circuits 16. Referring first to FIG. 2, the luminance input on line 30A is applied through a buffer amplifier 60 and an A to D converter 62 to a line 63 which is one input to a multiplexer 64. The output of multiplexer 64 is connected as the addressing input to a mapping look-up table RAM 66. The other input to multiplexer 64 is system black and white bus 14A. MUX 64 and the other MUX's in the system may be controlled by appropriate signals from processor 34 or by other suitable control signals. RAM 66 permits manipulation or mapping of the received input based on the type of input, the source of input, or other information relevant thereto. For example, differences in the digitized input values to MUX 64 for a desired gray scale output may be compensated for in mapping RAM 66. Contrast in the displayed image may also be enhanced by remapping received black and white gray scale values over a wider range or with greater separation between levels. If for a certain type of data most of the information is grouped in a particular area of the gray scale, increased spacing between levels may be provided in this area alone to enhance contrast. Mapping of gray/scale levels may also be performed for other purposes.

RAM 66 contains a plurality of gray/scale tables, each of which tables may be addressed by the digital value on the output lines from multiplexer 64. The table which is accessed to control mapping at any given time is determined by the value on lines 68 from programmable logic array 70. Array 70 may receive an input over line 72 from the appropriate one of the digital sources 12 when the input is from such source or may receive a control from processor interface 74 over line 76 under other conditions. Line or lines 72 contain flag bits from the sources which identify the type of data. Such lines may form part of the data bases 14 or be in addition to such bases. The number of lines 68 will depend on the number of different types of inputs or mapping options which are to be provided. For example, if there are eight types of data or mapping options, three lines 68 would be provided.

The data outputted from RAM 66 is applied through merge point 78 and lines 80 as the data input to frame memory 82. The other input to merge point 78 is the data input from the control processor on lines 36 (FIG. 1) which passes through interface 74 and lines 84. The image frame information inputted on lines 80 is stored at address locations in frame memory 82 which are determined by an input address on output lines 85 from input address circuit 86. The input address circuit operates under control of the processor and processor interface. Input address circuit 86 permits an input image frame to be compressed or clipped so as to be displayable in a half screen, quarter screen, or other selected size. The input address circuit also controls the memory frames in which received image frames are stored and, for compressed images, in which quad or other division of the frames the compressed image is stored. The manner in which the input address circuit 86 functions to perform these operations will be described in greater detail hereinafter.

An output address circuit 88 is also provided which generates output addresses on lines 87 under processor control to read out either a single display frame on CBW line 32B to video I/O circuit 18 or to read out selected compressed (or clipped) frames in selected pixel order over line 32B. As will be discussed in greater detail later, the output address circuit may also clip a stored image or may read out a given compressed or clipped frame a number of times in selected pixel sequence with the read out information being processed differently in the video I/O circuit during each read out. The output address circuits 88 will also be discussed in greater detail hereinafter.

As was previously discussed, information is originally derived from different sources, for example digital sources 12 and VTR analog source 20, which sources present the information in different formats. For black and white information, these different formats are not of concern since the inputs in different formats are mapped to be in the same format in RAM 66 before being stored in frame memory 82. However, as will be discussed shortly, color data is in fact stored in different formats. Thus, the pixel information outputted from frame memory 82 appears on CBW line 32B if the system is in the black and white mode for the particular image frame being displayed. When the system is in the system color mode, both black and white tissue data and color flow data may be outputted simultaneously from their respective memories. However, when the system is in the VCR color mode, an output is obtained, as will be described later, only from the color card, black and white information being obtained by setting the values of all three color outputs (red, green and blue) to equal values. Thus, program array logic (PAL) 89 is provided which receives as inputs a signal indicating whether the image to be displayed in a given quad is VCR color data over a plurality of lines 91A–91D. Thus, there is a signal on line 91A if the image being displayed in the top left quad 50A (FIG. 5) is VCR color data, a signal appears on line 91B if the image appearing in top right quadrant 50B is VCR color data etc. The remaining inputs to PAL 89 are a horizontal switch signal on line 93 and a vertical switch signal on line 95. The horizontal and vertical switch signals occur at the points in the image generating scan where transitions occur from one quad to the other. PAL 89 generates an output on $\overline{\text{VCRCL}}$ line 97 if, for the quad being scanned at a given time, there is no signal on the corresponding line 91 while PAL 89 generates an output on $\overline{\text{VCRCL}}$ line 99 if there is a signal on line 91 for the quad being scanned at the given time.

The $\overline{\text{VCRCL}}$ signal on line 97 is applied as the enable input to gate 101, the information input to gate 101 being output line 103 from frame memory 82. The output from gate 101 is a CBW line 32B.

Referring to FIG. 3, in the color circuit 58 the RMY line 30B and the BMY line 30C are each applied through a corresponding buffer amplifier 90 and A to D convertor 92 to separate inputs of 3:1 multiplexing circuit 94. The third input to multiplexing circuit 94 is system color line 14B.

The output from multiplexer 94 is applied as one address input to mapping look up table RAM 96. The other input to RAM 96 is output line 98 from programmable logic array 100. As with programmable logic array 70 (FIG. 2), array 100 may receive an input over a line 102 from one of the input sources 12 or 20 indicating the type of data being applied to the color board circuit or the input to PAL 100 may be obtained over line 104 from processor interface 106. RAM 96 permits the color inputs to be remapped in much the same way that RAM 66 functions to perform this operation for black and white inputs. Thus, depending on the type of data received or other selected criteria, the mapping of the color input information from multiplexer 94 may be selectively altered to achieve a desired color effect for any of the stored images. Note however that RAM 96 cannot map the systems originated inputs and the VCR originated inputs to be identical since these inputs are presented and stored in completely different formats.

A frame memory 110 is provided which stores frame images in substantially the same manner as frame memory 82. The frame image information to be stored in memory 110 is received over line 112 from either the output of RAM 96 or over a data line 113 from processor interface 106. Input addressing is controlled by input address circuit 86 (FIG. 2) over lines 85 and output addressing is controlled by output address circuit 88 over lines 87. It should be noted that since a single image frame may contain both black and white and color data, for example tissue data and color flow data in ultrasonic scan images, frame images may be read out simultaneously from both frame memory 82 and frame memory 110. For VCR data, luminance data is always stored in memory 82 and is used with image data stored in memory 110 to obtain images for black and white and for color. Information concerning a given image frame may also be stored simultaneously in both memories.

Since the green-minus-luminance (GMY) signal for a given color display is defined by the following equation:

$$GMY = \alpha BMY + RMY + K \quad (1)$$

(where: $\alpha$, and K are constants) the storage required to store a color image frame is reduced by storing only the BMY and RMY signals and deriving the GMY signal therefrom in accordance with Equation (1) above. This derivation is obtained by utilizing the BMY and RMY outputs from frame memory 110 as address inputs to a GMY look-up table ROM 120. The GMY output from ROM 120 is applied as one input to adder circuit 122. The BMY and RMY outputs from frame memory 110 are also applied as one input to adders 124 and 126 respectively. The other input to each of adders 122, 124 and 126 is the Y value on line 103 from black and white circuit 56 (FIG. 2). The output from adder 122 on line 123 is thus the green level (GMY+Y=G) output from frame memory circuits 16. Similarly, the output on line 128 from adder 124 is the blue (BMY+Y=B) output and the output from adder 126 on line 32A is the red (RMY+Y=R) output. The green level signal on line 123 is applied as the information input to gate 131, the output from this gate being connected to the CBW/Green output line 32B. Similarly, the blue output on line 28 is applied as the information input to gate 132 and the system color output from frame memory 110 on line 130, when the data being outputted is system color data is applied as the information input to gate 133. The output from gates 132 and 133 is the CCL/Blue output line 32C. The output from adder 126 is used directly as red output 32A. Gates 131 and 132 are enabled by a signal on $\overline{VCRCL}$ line 99 which thus permits the green and blue outputs to be passed when the system is in the color mode. Gate 133 is enabled by a signal on $\overline{VCRCL}$ line 97 thus enabling the system color output to be applied to line 32C when the system is not in the VCR color mode.

Figure 4:
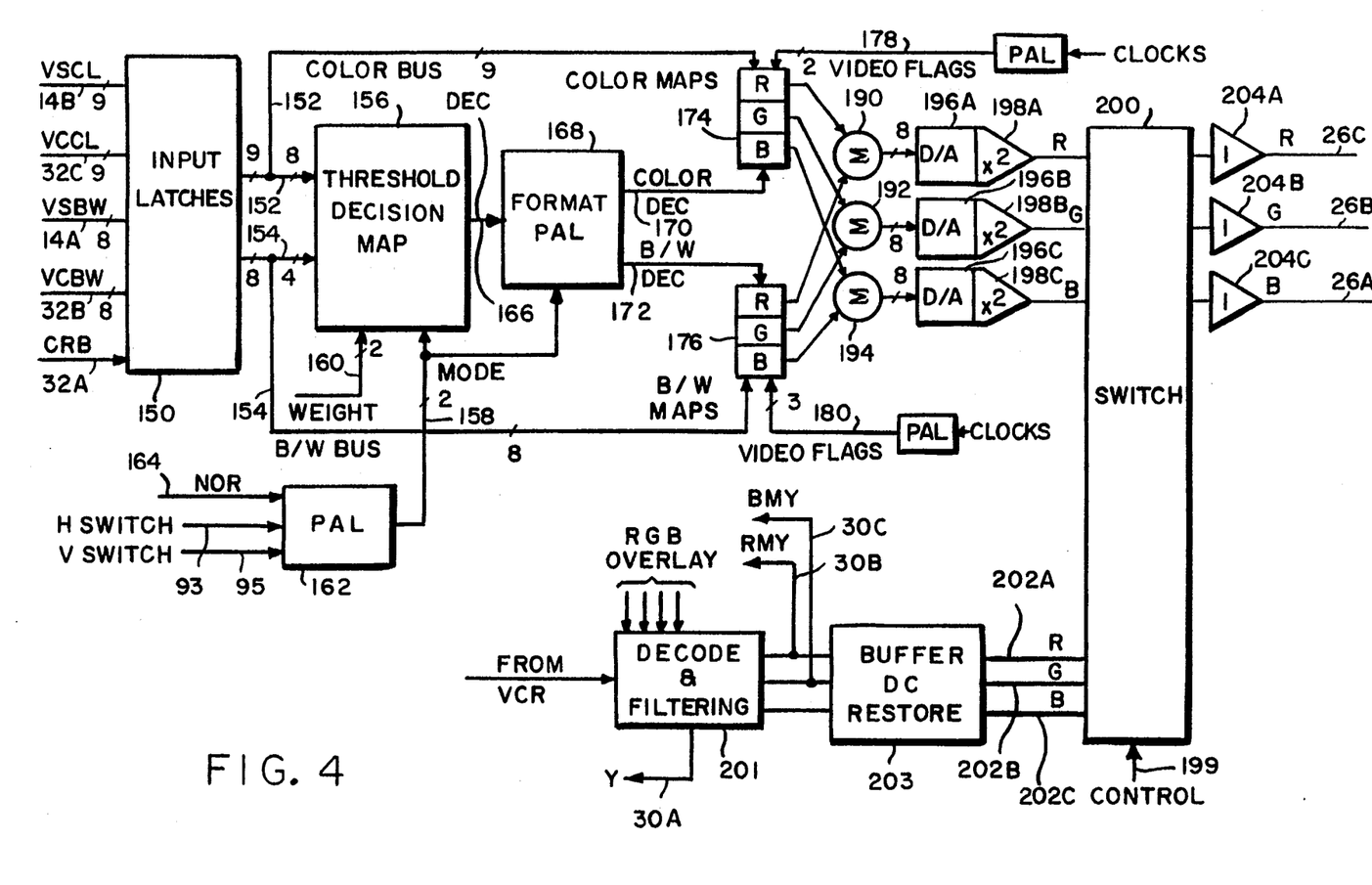
FIG. 4 is a schematic block diagram of a video I/O circuit suitable for use as the video I/O circuit in FIG. 1.

FIG. 4 illustrates circuitry for the video I/O circuit 18 of FIG. 1. The five inputs to circuit 18, system buses 14A and 14B and frame memory output lines 32A-32C, are applied as inputs to input latches 150. If, for example, there are nine lines on each of the color buses and eight lines on each of the black and white buses, there would be nine color input latches and eight black and white input latches. The contents of the color latches are applied as outputs on color bus 152 while the outputs from the black and white latches are applied as outputs on black and white bus 154. A selected number of the most significant bits of the color flow bus 152 and the black and white bus 154 are applied as inputs to threshold decision map circuit 156. For example, the eight most significant bits from color bus 152 and the four most significant bits from black and white bus 154 may be applied as inputs to map circuit 156. Map circuit 156 may be a table-look-up RAM, comparison circuits or other suitable circuitry for performing the threshold mapping function.

In addition to the data inputs from buses 152 and 154, circuit 156 also has as inputs lines 158 which are indicative of the mode in which the system is operating for the image frame being processed and lines 160 which may be used to control the weighting or threshold levels of the threshold circuit. Lines 158 are the output lines from programmable array logic circuit 162, the input lines 164 to which are for example eight lines indicating the mode of display for the image frame in each quadrant of the display (i.e., quadrants 50A-50D, FIG. 5). PAL 162 is synchronized with the received input information by, for example signals on the H switch line 93 and the V switch line 95 such that the output on lines 158 corresponds to the two of the eight lines 164 which are indicative of the mode for the quad 50 being inputted at the given time. Processor 34 may apply signals to lines 160 to selectively vary the weight or threshold levels. Circuit 156 compares the threshold level of the inputs to a stored threshold level for black or white or color for the particular mode being inputted on lines 158 and generates an output on line 166 indicative of whether the input exceeds the threshold. The circuit 156 may thus perform a noise reduction function.

The signal on line 166 is applied as one input to circuit 168, the other inputs to which are current mode lines 158. Depending on the selected mode of display and whether any displayed pixel in such mode equals or exceeds the appropriate threshold, circuit 168 generates an output on appropriate ones of color decision output line 170 and B/W decision output line 172. The lines 170 and 172 are applied as enabling inputs to mapping RAMs 174 and 176 respectively. Color bus 152 is applied as an addressing input to color map RAM 174 and black and white bus 154 is applied as the addressing input to black and white map RAM 176. Video flags are also applied to RAMs 174 and 176 through lines 178 and 180 respectively, which flags are indicative of the display quad currently being generated or refreshed. Thus, each image frame of a display may be independently color mapped to achieve a desired video effect. Further, while black and white outputs may be obtained from RAM 176 by keeping the red, green and blue outputs equal and varying only their intensity, it is also possible to selectively colorize a black and white display by suitably mapping the inputs received on bus 154 in RAM 176 so that the red, green and blue outputs for at least selected intensity levels are not equal.

The red outputs from both RAM 174 and 176 are summed in summing circuit 190, the green outputs are summed in summing circuit 192 and the blue outputs are summed in summing circuit 194. The output from each of the summing circuits 190–194 is applied through a corresponding D to A converter 196A–196C and multiplier 198A–198C to switch 200. Switch 200 may be set to either pass outputs from the color mapping circuits 174 and 176 to the output of the video I/O circuit 18 or to pass outputs from VTR 20 which are applied through suitable standard decoding, filtering and buffering circuitry 201 and 203 and lines 202 to switch 200. The outputs from switch 200, the setting of which may be controlled by suitable means such as by a control input from processor 34 on line 199, are applied through buffer amplifiers 204A–204C to blue, green and red output lines 26A–26C from the video I/O circuit 18. The signals on lines 26 may also be applied through suitable standard conversion logic circuitry to serve as the analog inputs 24 to VTR 20. The VCR output lines 30A, 30B and 30C are also taken from decoding and filtering circuits 201.

Figure 6:
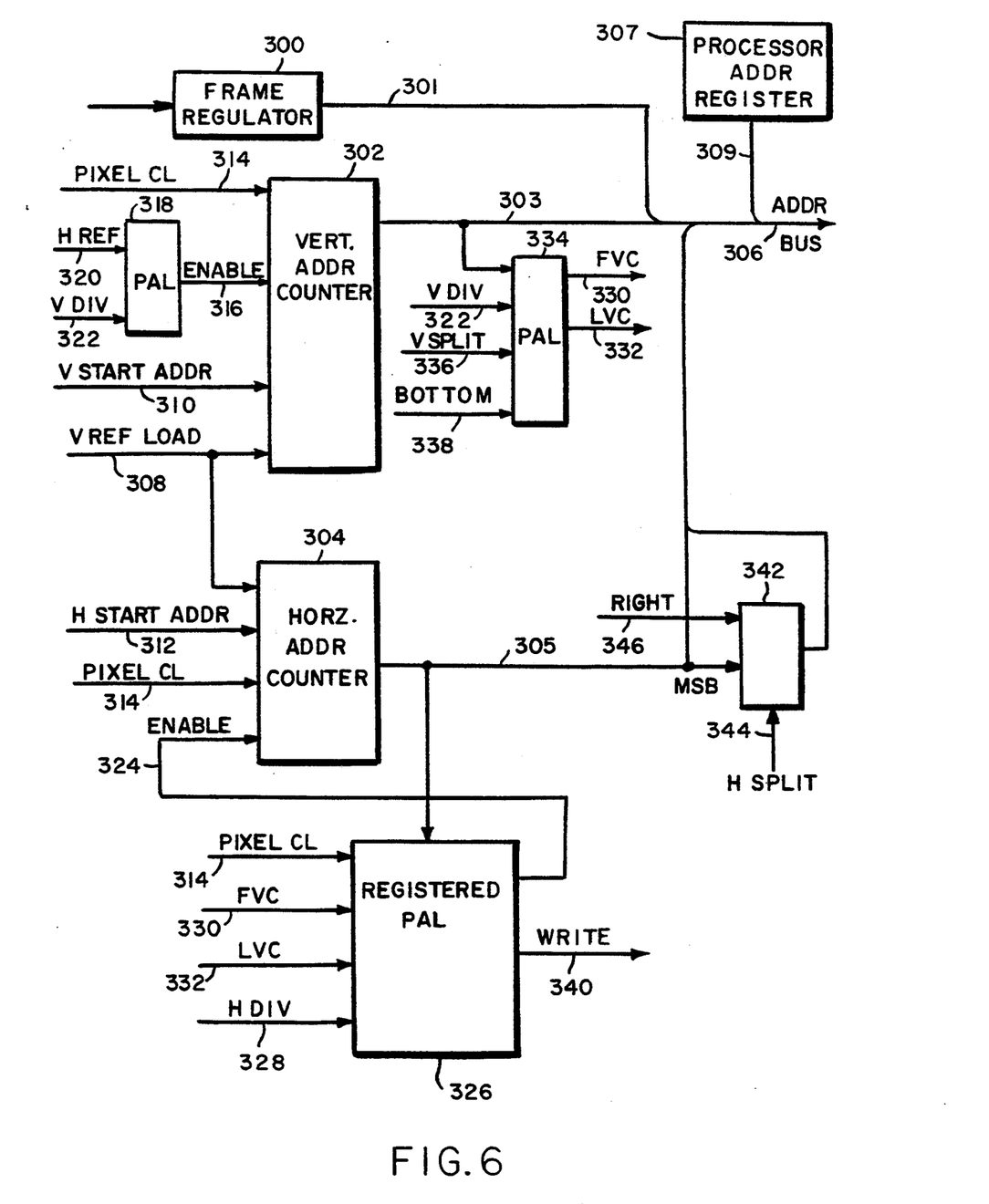
FIGS. 6 and 7 are schematic block diagrams of an input address circuit and an output address circuit respectively suitable for use in the circuit of FIG. 2.

FIG. 6 shows an input address circuit suitable for use as the input address circuit 86 in black and white frame memory circuit 56 (FIG. 2). The frame memory 82 in circuit 56 is divided into a plurality of addressable frame areas, each of which is adapted to store information for a full frame of display on video display 28. Thus, if video display 28 is a 512×512 display, there would be 512×512 addressable pixel position in each frame area of memory 82. Each pixel position would have a number of bits required to convey gray scale information, for example eight bits. Thus, within each frame area there would be 512 horizontal address positions and 512 vertical address positions.

From the above, it is apparent that each address for frame memory 82 would contain three elements, a frame address, a horizontal pixel address, and a vertical line address.

Referring to FIG. 6, for input addressing, the frame address from processor interface 74 is stored in frame register 300. The row address for the pixel being accessed at any given time is stored in vertical address counter 302 and the pixel address within the row is stored in horizontal address counter 304. The output lines 301, 303 and 305 from frame register 300, vertical counter 302 and horizontal counter 304 respectively form address bus 306. A processor address register 307 may also be provided, the output lines 309 from which also form part of address bus 306. Address register 307 is utilized to permit processor 34 to address and access any pixel position in a frame memory.

Just as the display shown in FIG. 5 is divided into four quadrants 50A–50D, each frame area in frame memory 82 (and in frame memory 110 also addressed by circuit 86) is also divided into four quadrants. Thus, assuming a 512×512 pixel display, the upper left quadrant is formed in the area between horizontal address 0 and horizontal address 255 and between vertical address 0 and vertical address 255. The upper right quadrant is between horizontal addresses 256 and 511 and vertical address 0 and 255. The lower left quadrant is defined between horizontal addresses 0 and 255 and vertical addresses 256 through 511, while the lower right quadrant is defined between horizontal addresses 256 and 511 and vertical addresses 256 and 511.

The circuit shown in FIG. 6, is designed to assure That an input frame is stored in the appropriate quadrant in a given frame area of frame memory 82 and to, where necessary, compress or clip the image so that it will fit within the selected portion of a frame area in which it is to be stored. Thus, prior to the beginning of each image store operation, a one-per-frame "V Ref" signal is applied to line 308, enabling the storage of a vertical start address applied over lines 310 in vertical counter 302, and the storage of a horizontal start address applied over lines 312 in horizontal counter 304. Thus, if the frame image were to be stored in the upper right quadrant of the frame area indicated in frame register 300, horizontal counter 304 would initially be set to a count of 256 and vertical counter 302 would initially be set to a count of 0.

Pixel clocks on line 314 are operative to increment vertical address counter 302 and horizontal address counter 304 when these counters are enabled. An enable input to vertical address counter 302 is obtained on line 316 from programmable array logic circuit 318. The inputs to PAL 318 are an H REF signal on line 320 which is a horizontal sync pulse appearing once per line, and a V DIV signal on line 322 indicating that vertical compression is to be performed. If there is no signal on line 322 indicating that vertical compression is not being performed, each horizontal reference signal on line 320 is passed to Enable line 316, causing the vertical address counter to be incremented for each frame line. When a signal appears on line 322 indicating that vertical compression is desired, PAL 318 passes only every other H REF signal on line 320 to Enable line 316, thus inhibiting the stepping of the vertical counter for every other vertical line.

The enable input to horizontal address counter 304 is obtained over line 324 from register PAL 326. Two Inputs to PAL 326 are pixel clock 314 which serves to synchronize the enable output from the PAL with the incrementing pixel clock to the horizontal counter and H DIV line 328 which has a signal on it when horizontal compression is to be performed. The remaining two inputs to PAL 326 are first vertical count (FVC) line 330 and last vertical count (LVC) line 332 which lines are the output lines from PAL 334. The inputs to PAL 334 are the current vertical count on line 303, the V DIV line 322, a V Split line 336, which has a signal on it when the information being stored is being stored in a vertical split-screen mode, and Bottom line 338 which has a signal on it when the vertical split screen information is being stored in the lower half of the storage frame. The absence of a signal on line 338 means that, assuming the system is in the vertical split-screen mode, information is to be stored in the top half of the memory frame. PAL 334 utilizes the input described above to determine when the vertical count on lines 303 is equal to the vertical count at which storage is to begin for the particular image frame being stored and generates an output on line 330 at that time. Similarly, PAL 334 generates an output on line 332 when it determines that the vertical address on lines 303 is equal to the last vertical address at which image information is to be stored for the current image.

Thus, PAL 326 will generate an enable output to horizontal address counter 304 only when the vertical count is within the prescribed limits for storing the received image. When a vertical count is within these limits, PAL 326 will generate an output on line 324 for each pixel clock on line 314 if horizontal compression is not to occur (i.e., if there is no signal on line 328) and will generate an output for every other pixel clock if a signal is present on line 328, resulting in horizontal compression of the received image. PAL 326 also delays the signal on line 324 slightly to permit the address counting operation to be completed then generates a WRITE output on line 340. A WRITE output thus appears on line 340 only when the vertical count is within the prescribed limits, the WRITE signal appearing for each pixel clock when horizontal compression is not to occur and for every other pixel clock when horizontal compression is to occur.

All but the most significant bit of the horizontal address on lines 305 are applied directly to address bus 306. However, the most significant bit of the horizontal address lines 305 is applied to circuit 342, the other inputs to which are H Split line 344 and RIGHT line 346. A signal appears on H Split line 344 when the screen is to be split horizontally (i.e., separate images are to appear on the left and right portion thereof). A signal appears on line 346 when the split screen image is to be written on the right hand side of the memory frame. In the absence of signal on line 346, a split-screen image is written on the left hand side of the memory frame. Circuit 342 passes the most significant bit of the horizontal address on lines 305 directly to bus 306 if there is no signal on either lines 344 or line 346, or in other words when the system is not in split-screen or when the system is in split-screen but the image is to be written on the left hand side of the screen. If both horizontal split-screen and RIGHT bits are present on lines 344 and 346, circuit 342 forces the most significant bit of the horizontal address to the address required for writing the image on the right hand portion of the screen (i.e., sets this bit to a "1").

The circuit shown in FIG. 6 is thus adapted to store a received image in a desired frame area of frame memory 82 and of frame memory 110 and is adapted to store this image in any desired half or any desired quad of the selected frame area and to perform the compression of the image necessary to store it in the reduced area.

While a particular method of compressing an image is shown in FIG. 6, it is apparent that the image may also be compressed using other standard compression techniques. For example, roller ball 44 (FIG. 1) may be used by the operator to control a cursor to perform selective cropping of an image appearing on video display 88. The cropped image may then be applied over line 84 for storing in memory 82. While the cropped image would be a compressed image, compression would not be required in the circuit of FIG. 6. Thus, if cropped images were also to be stored in the frame memory, V DIV AND H DIV inputs would not be present on line 322 and 328 when such images were received but the V split and H split inputs would be present on lines 336 and 344. Thus the cropped images would be stored in the half or quad of the memory frame indicated by the signal on BOTTOM line 338 and RIGHT signal on line 346, but would not be compressed. As previously indicated, the circuit of FIGS. 6 is used as the input address circuit 86 for both black and white circuit 56, and color circuit 58 (FIG. 3).

Figure 7:
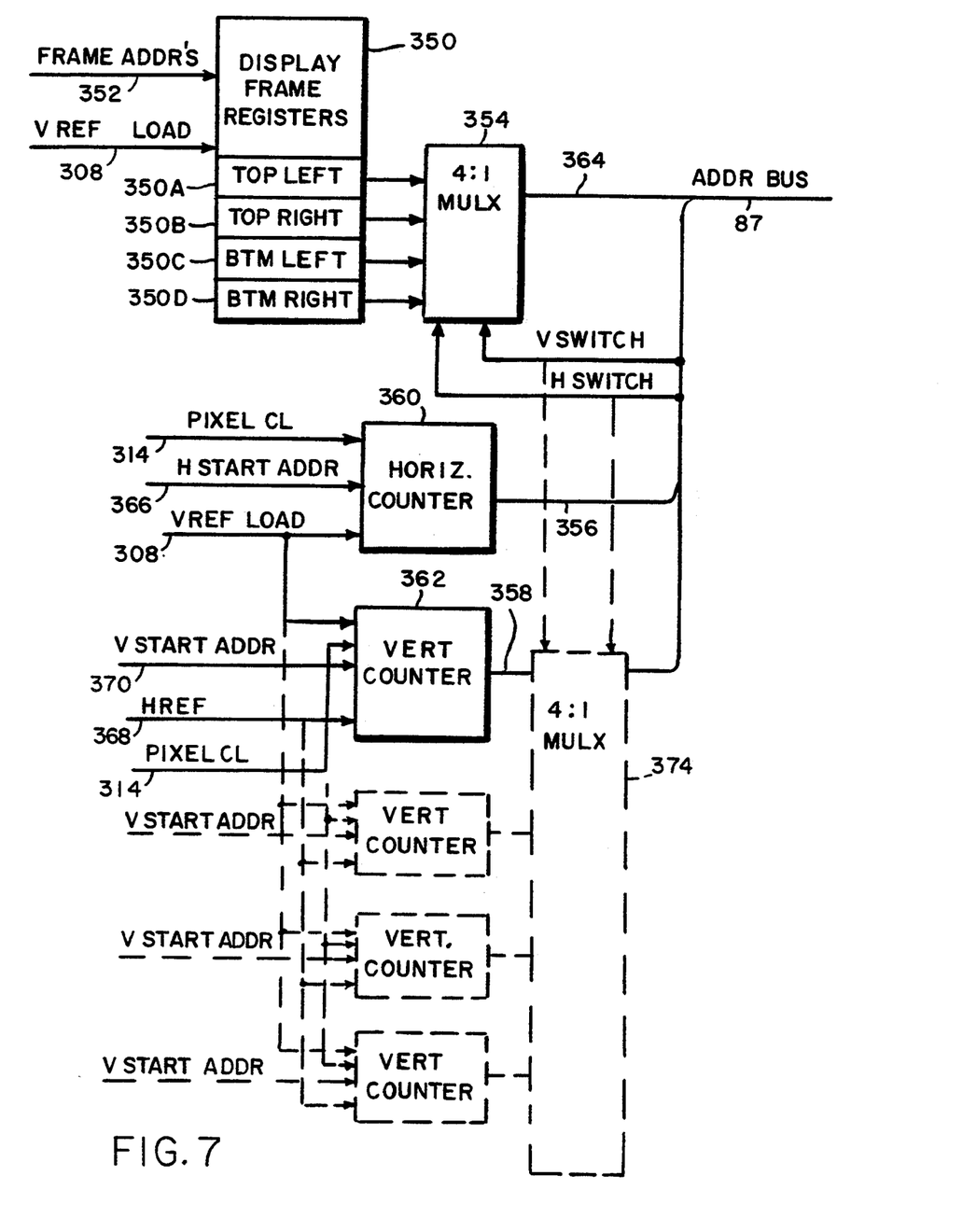

FIG. 7 shows an output address circuit suitable for use as the output address circuit 88 in the black and white circuit 56 of FIG. 2. This circuit has a plurality of display frame registers 350 each of which contains a frame address where an image to be displayed in a selected quadrant of the display (FIG. 5) is stored. Thus, register 350A indicates the frame in frame memory 82 (and/or 110) where the image to appear in quadrant 50A is stored, register 350B indicates the memory frame in which the image displayed in area 50B is stored, register 350C indicates the memory frame in which the image to be displayed in area 50C is stored and register 350D indicates the memory frame in which the image to be displayed in area 50D is stored. When the display on display 50 contains only a single image, the same frame number would appear in all of the registers 350. Where different images are to appear in each of the quads of the display, depending on how the frames to be displayed were initially stored, the image to be displayed in each of the quads may all be stored in the same frame, in which case the frame numbers in each of the frame registers would be the same, or the display may be assembled from compressed (or cropped) images stored in a number of different frames in the frame memory, in which case the frame numbers in the registers 350 would be different.

A special case is where, as shown in FIG. 5, a single image is to be processed in the video I/O circuit 18 to appear in different form in various quadrants. This is illustrated in FIG. 5 where the image in area in 50A contains both current tissue and color flow data while the image in area 50C contains only the tissue data from the image of 50A and the image in area in 50D contains only the color flow data from the current image. Under this condition, the same frame number would appear in registers 350A, 350C, and 350D. However, as was discussed in conjunction with the description of FIG. 4, these images would be operated upon differently by the thresholding and color mapping circuits in the video I/O circuit to obtain the desired display.

The frame addresses to be stored in registers 350 are inputted over data input lines 352 from processor interface 74. The load input to frame registers 350 is the V REF line 308 which has a signal on it once per frame. Thus, the loading of the display registers normally occurs during the interframe spacing when the V REF signal is generated.

The output lines from the display frame registers 350 are applied as the inputs to a 4:1 multiplexer 354. The control inputs to multiplexer 354 are the V Switch and H Switch values on the output busses 356 and 358 respectively from horizontal counters 360 and vertical counter 362. Thus, multiplexer 354 will generate an output on frame lines 364 which is the output from top left display frame register 358 when top left area 58 of the display is being scanned. Multiplexer 354 will generate as the output on lines 364 the contents of registers 350B, 350C and 350D when the display scan is in areas 50B, 50C and 50D respectively.

The inputs to horizontal counter 360 are pixel clock line 314, VREF line 308 and horizontal start address line 366. Similarly, the inputs to vertical counter 362 are the V REF line 308, pixel clock line 314, an H REF line 368 and a vertical start address line 370. Thus, once per frame, when the V REF signal is present, a horizontal start address and a vertical start address are loaded into the counters 360 and 362 respectively. In the simplest form of the invention, this address might be the address 00 for both counters. Horizontal counter 366 is incremented by each received pixel clock on line 314 and vertical counter 362 is incremented when an H REF signal appears on line 368 and a pixel clock also appears on line 314, the H REF clock appearing once per line during a flyback period between the end of one line and the beginning of the next. The pixel clock applied to the vertical counter is for synchronization. For this simplified version of the circuit, the output lines 356, 358 and 364 from the horizontal counter, vertical counter and display frame registers (via multiplexer 354) form address bus 87 which contains the output address for the pixel being read out at each given time to generate or refresh the display on video display 28.

With the simplified form of the circuit just described, the information to be read out would have to initially be stored so that the quad in which an image is displayed during a given display is the same as the quad in which the image is stored in its given memory frame. Thus, while this system would provide flexibility as to the memory frame in which a given image was stored, once an image was stored in a given quad of a storage frame, flexibility would not exist as to the display quad in which such image could be displayed.

There are a number of ways in which this limitation could be overcome. One way of overcoming this limitation, which is illustrated in dotted lines for the vertical counter 362, is to provide a separate counter for each of the display quads, with a separate start address being loaded into each of the counters. With multiple vertical counters, either incrementing of the counters for the bottom left and the bottom right quadrants would need to be inhibited when the upper two quadrants are being refreshed or written or, preferably, the initial value stored in these counters would be such that, the counters incrementing to zero when they are full, the proper start value would be in these counters when the V switch point was reached by the display clock. The output from the counters are passed through a multiplexer circuit 374 which functions in the same way as multiplex circuit 354 in response to the vertical and horizontal switch values to permit the vertical count from the appropriate counter to appear on the vertical output bus. However, with this arrangement, the V Switch and H Switch controls to the multiplexers would need to be obtained from the display clock rather than from the counter outputs since the two would no longer necessarily be the same.

Separate horizontal counters 360 could also be provided for each display frame which would be similarly independently initially loaded so that the appropriate starting horizontal memory frame address would be in this register when refresh of each horizontal line of a quad commenced. A multiplexer such as the multiplexer 374 would need to be provided for these counters.

The alternative would be to provide a single horizontal counter (or a vertical counter) with offset registers being provided containing requisite horizontal start values for the memory frame quads being utilized to refresh each display frame quad. Values from the appropriate register would be loaded into the appropriate counter (for example the horizontal counter) at each horizontal and vertical switch point. Those skilled in the art could also utilize other means for achieving the same flexibility.

If separate start capabilities are available for each quadrant, the circuit may also be used to clip images at the output. Thus, assuming an image filled a complete memory frame but it was desired to display this frame in only the left hand portion of a display frame, instead of the initial horizontal values loaded into the counters for the top left and bottom left quadrants being initially zero, these counters would be initially loaded with the memory address at which the clipped image was to begin. The horizontal counter would then count off 256 positions to the right hand clip point at which point the horizontal switch input would cause the address bus to receive its addresses from a different counter. At the H REF time, the offset value could be loaded back into the appropriate horizontal counters in preparation for the next scan line.

The circuit shown in FIG. 7 is thus adapted to read out either a single frame or any combination of up to four different frame images stored anywhere in the frame buffer in any permutation or combination and to permit a single image to be displayed in any quadrant of display 50 or to permit a single image to be processed in a variety of ways and to permit the differently processed versions of the same image to appear in different quadrants of the same display.

A flexible multiple image display system is thus provided. While a single embodiment of the invention has been shown and described above, and various modifications to such circuit have been suggested at various points throughout the description, it will be apparent to one skilled in the art that the embodiment disclosed is for purposes of illustration only and that the foregoing and other changes in form and detail may be made therein by one skilled in the art without departing from the spirit and scope of the invention.

What is claimed is:

1. A system for periodically refreshing a display frame on a display device, which display frame is formed from a plurality of display pixels and is adapted to display a plurality of images, each image appearing as a separate image frame, the image frames being displayed forming said display frame, the system comprising;

at least one source for providing image frames;

frame memory means which is divided into a plurality of memory frames, each of said memory frames having a sufficient number of memory positions to store pixel data for a single display frame, and each of said memory frames being subdividable into a plurality of memory image frames, each of which has a sufficient number of memory positions to store an image frame;

means for selectively storing image frames from said at least one source in selected memory image frames in selected memory frames in said frame memory means:

means operative during each periodic refreshing of the display device, where the device is displaying a plurality of images which were stored in memory image frames of different memory frames, for selectively reading out the image frames from said frame memory means, said readout means reading out image frames from at least two memory frames within the frame memory, each read-out image frame corresponding to an image frame of the display frame, and each image frame of the display frame, each image frame being read out from the memory frame in which it is stored which memory frame is independent of and may be different than the memory frame for other readout images; and means for utilizing each readout image frame to control refresh of at least one image frame displayed on said display device.

2. A system as claimed in claim 1 wherein said means for selectively storing includes means for providing selected information concerning each image frame to be stored in said frame memory means, and means responsive to said selected information for controlling the mapping of values stored for the pixels of the image frame when stored in said frame memory means.

3. A system as claimed in claim 1 wherein said means for selectively storing includes means for storing in a single memory frame of said frame memory means the image frames to be displayed, said image frames being stored in compressed form; and
 wherein said read-out means includes means for reading out said single frame to control refresh of the display.

4. A system as claimed in claim 3 wherein said compressed form is obtained by selectively cropping the image.

5. A system as claimed in claim 3 wherein said compressed form is obtained by selectively dropping pixels of the image.

6. A system as claimed in claim 1 wherein said means for selectively storing includes means for storing in compressed form each image frame to be displayed in an independent memory frame of said memory frame; and
 wherein said reading-out means includes means for reading out appropriate pixels from the appropriate memory frame of the frame memory to control refresh of the display of each pixel of the display.

7. A system as claimed in claim 6 wherein said compressed form is obtained by selectively cropping the image.

8. A system as claimed in claim 6 wherein said compressed form is obtained by selectively dropping pixels of the image.

9. A system as claimed in claim 6 wherein the means for selectively storing is operative to perform the compression function.

10. A system as claimed in claim 1 wherein said at least one image source includes at least one source of digital image frames, and at least one source of analog image frames;
 wherein said means for selectively storing includes means for converting image frames from said analog source to digital; and
 wherein the simultaneously displayed images may include an image from the digital source and an image from the analog source.

11. A system as claimed in claim 10 wherein said digital image source is an ultrasonic image scanning system; and
 wherein said source of analog images is a source of stored ultrasonic images.

12. A system as claimed in claim 1 wherein said at least one image source includes a source of ultrasonic scan images;
 wherein an ultrasonic scan image may contain information of at least two different types;
 wherein said means for selectively storing including means for storing the scan image;
 wherein said means for reading out includes means for selectively reading out appropriate pixels of said stored scan image a number of times equal to a number of images of said scan image to be simultaneously displayed on said display; and
 wherein said utilizing means includes means for selectively processing the information types in the multiple read-out scan image so that each display image contains such information in different permutations and combinations.

13. A system as claimed in claim 12 wherein said permutations and combinations include summing said types of information and displaying each of said types of information separately.

14. A system as claimed in claim 12 wherein said permutations and combinations include thresholding of both types of data or thresholding of one type of data while displaying the other type without thresholding.

15. A system as claimed in claim 12 wherein the two types of information are tissue data and flow data.

16. A system as claimed in claim 1 wherein said read-out means may read-out a single image frame from said frame memory means two or more times during a single refresh of a display frame; and
 wherein said means for utilizing includes means for selectively processing said image frame to cause multiple images of said frame to be displayed, said multiple images containing the content of said image frame in various permutations and combinations.

17. A system as claimed in claim 1 including means for selectively color mapping each of the simultaneously displayed image frames.

18. A system as claimed in claim 17 wherein each image frame may contain two different types of information; and
 wherein said color mapping means includes means for independently color mapping each of said types of information.

19. A system as claimed in claim 18 wherein one of said types of information is normally to be displayed in color and the other type of information is normally to be displayed in black and white.

20. A system as claimed in claim 1 wherein said at least one image source includes a first image source which presents pixel information for an image frame in a first format and a second image source which presents pixel information in a second formate different from the first format;
 wherein said means for selectively storing stores pixel information in both said first and second formats in said frame memory means;
 wherein said reading out means reads out the pixel information in the different formats; and
 wherein said utilizing means utilizes the read-out pixel information in the different formats to control the display on said display device.

21. A system as claimed in claim 20 wherein said first image source is a digital source which presents the pixel information in a selected digital format and wherein said second source is an analog source which presents the pixel information in a standard composite video format.

22. A system as claimed in claim 1 wherein said means for reading out includes means for selectively cropping stored images.

23. A system as claimed in claim 22 wherein said means for selectively cropping includes means for storing a horizontal and/or vertical address at which reading out of a selected memory frame is to begin, and means for terminating readout of said selected memory frame after a selected number of pixels and/or lines have been read out.

24. A system for periodically refreshing one or more simultaneously displayed images on a video display device, which device is of a type wherein each image appears as an image frame of a display frame formed from a plurality of display pixels, the system comprising;

at least two sources of image frames, one of said sources being a digital source presenting pixel data in a first selected digital format, and the other source presenting pixel data in a second selected format;

frame memory means containing a plurality of memory frames each of which is subdividable to store one or more image frames for display on said display device;

means for selectively storing image frames from said at least two image sources in the memory frames of said frame memory means, said frame memory means storing image frames from said digital source in said digital format and storing image frames from said other source in digital form in said second selected format;

means for indicating the format for each stored image frame;

means operative during each periodic refreshing of the display device, where the device is displaying a plurality of images which were stored in memory image frames of different memory frames, for selectively reading out image frames from said frame memory means, said readout means reading out image frames from at least two memory frames within the frame memory, each read-out image frame corresponding to an image frame of the display frame, and each image frame being read out from the memory frame in which it is stored, which memory frame is independent of and may be different than the memory frame for other readout images; and means for utilizing said read out image frames in the corresponding format from said indicating means to control each refreshing of the at least one image displayed on said display device.

25. A system as claimed in claim 24 wherein said other source is an analog source, and wherein said second selected format is a standard composite video format.

* * * * *